UNITED STATES PATENT OFFICE.

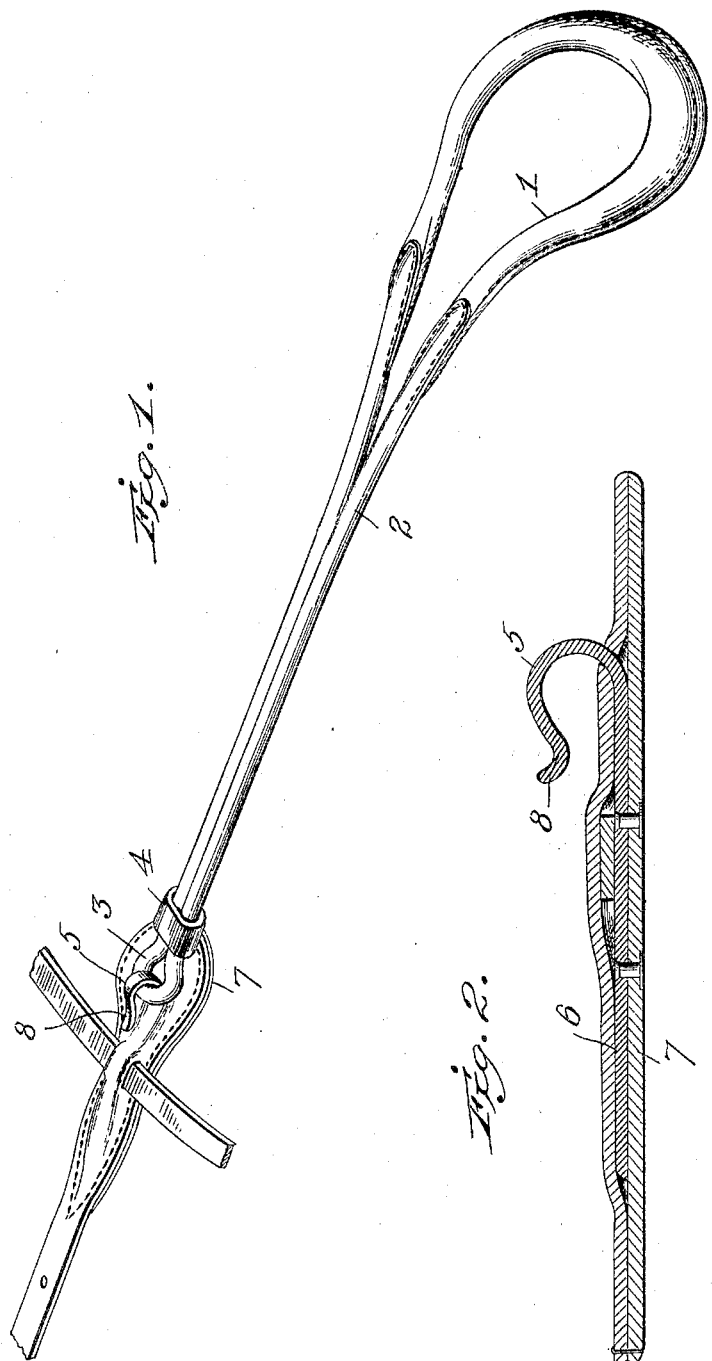

RUDOLF C. BECHER, OF FORT DODGE, IOWA.

HARNESS.

No. 802,796. Specification of Letters Patent. Patented Oct. 24, 1905.

Application filed June 12, 1905. Serial No. 264,846.

*To all whom it may concern:*

Be it known that I, RUDOLF C. BECHER, a citizen of the United States of America, residing at Fort Dodge, in the county of Webster and State of Iowa, have invented certain new and useful Improvements in Harness, of which the following is such a full, clear, and exact description as will enable others skilled in the art to which it appertains to make and use the same, reference being had to the accompanying drawings, forming a part hereof.

This invention relates to improvements in harness, and has special reference to cruppers, the object of the invention being to provide means whereby the animal's tail may be placed through the crupper without disturbing the position of the back-strap. This object is attained by the use of such an arrangement as is illustrated in the accompanying drawings; and the invention consists in certain novel features of the same, as will be hereinafter first fully described and then particularly pointed out in the claims.

In the annexed drawings, Figure 1 is a perspective view of a crupper and a portion of the back-strap of a harness embodying the invention, and Fig. 2 is a longitudinal section through the end of the back-strap.

In carrying out my invention the body 1 of the crupper is constructed of the usual rounded style, and the shank or fork 2 of the same is constructed of a strap formed into a bight 3 and having its ends sewed or otherwise secured to the ends of the body. A ring 4, of leather or other material, is secured around the strap or crupper-shank 2 close to the bight 3, so that the same constitutes a small loop, as clearly shown. The end of the back-strap is widened somewhat, and a hook 5 projects up through an opening therein near the extremity thereof, the said hook being provided with a long stem 6, extending along the under side of the back-strap. A covering 7, of leather, is secured to the under side of the back-strap, so as to inclose the stem 6 of the hook, and the said stem may be riveted or otherwise secured to either the back-strap or the said covering. The end 8 of the hook is turned down toward the shank of the same, so as to present a restricted opening for the passage of the bight or loop 3 of the crupper, and consequently guard against the accidental displacement or release of the crupper.

It is now the common practice to make the crupper integral with or permanently secured to the back-strap of the harness, and it is a frequent experience that after the harness has been placed over the animal the back-strap will be forced or will slip to one side when and while the tail is being brought into engagement with and through the crupper. This slipping of the back-strap is very objectionable, as it necessitates a readjustment of the harness, causing double work. The necessity of handling the tail of the animal to such an extent is also distasteful and disagreeable. These objections are all overcome by my invention, as the harness is placed on the animal without the crupper, and after the back-strap is in place the crupper is slipped up on the tail and the loop at the end of the crupper-shank is engaged in the hook on the back-strap, thereby securing the crupper in position without disturbing or requiring any handling of the back-strap. The construction is simple and presents a neat appearance and can be made from short pieces of leather, so as to effect an economy of material.

Having thus described my invention, what I claim, and desire to secure by Letters Patent, is—

1. In a harness, the combination of the back-strap, a hook carried thereby, and an elongated endless crupper having one end arranged to engage over said hook.

2. In a harness, the combination of the back-strap, a hook projecting therethrough and having a stem extending along the under side of the back-strap, a covering secured to the back-strap over the said stem, and a crupper having its end arranged to engage said hook.

3. In a harness, the combination of the back-strap, a hook carried thereby, and a crupper having its sides formed into a bight to engage the said hook, and a ring secured around the sides of the crupper near the bight end of the same.

In testimony whereof I have signed this specification in the presence of two subscribing witnesses.

RUDOLF C. BECHER.

Witnesses:
   S. H. MAGOWAN,
   S. H. PORTZ.